United States Patent
Minami et al.

(10) Patent No.: US 7,151,226 B2
(45) Date of Patent: Dec. 19, 2006

(54) OPENING AND CLOSING DEVICE AND ELECTRONIC APPARATUS USING THE SAME

(75) Inventors: Katsuichi Minami, Fukui (JP); Koji Sakai, Fukui (JP); Yasuchika Kudo, Fukui (JP); Masaki Nakase, Fukui (JP); Yusho Nakase, Fukui (JP); Takehiko Konja, Fukui (JP); Tatsuya Tsuda, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 443 days.

(21) Appl. No.: 10/470,338

(22) PCT Filed: Nov. 13, 2002

(86) PCT No.: PCT/JP02/11829

§ 371 (c)(1),
(2), (4) Date: Jul. 28, 2003

(87) PCT Pub. No.: WO03/042559

PCT Pub. Date: May 22, 2003

(65) Prior Publication Data

US 2004/0052058 A1 Mar. 18, 2004

(30) Foreign Application Priority Data

Nov. 16, 2001 (JP) ............................. 2001-351445
Mar. 29, 2002 (JP) ............................. 2002-096524

(51) Int. Cl.
*H01B 17/16* (2006.01)
(52) U.S. Cl. .................... 174/161 R; 174/135; 361/724
(58) Field of Classification Search ............ 174/161 R, 174/135; 361/724, 71
See application file for complete search history.

(56) References Cited

U.S. PATENT DOCUMENTS 6,148,480 A * 11/2000 Cooke ......................... 16/303
2001/0016474 A1 8/2001 Nagashima

FOREIGN PATENT DOCUMENTS

| JP | 5-263563 | 10/1993 |
| JP | 10-70594 | 3/1998 |
| JP | 10-173747 | 6/1998 |
| JP | 2001-127855 | 5/2001 |
| JP | 2002-89542 | 3/2002 |
| JP | 2002-344597 | 11/2002 |

* cited by examiner

*Primary Examiner*—Jinhee Lee
(74) *Attorney, Agent, or Firm*—Wenderoth, Lind & Ponack, L.L.P.

(57) ABSTRACT

An opening and closing device and an electronic apparatus using this device. In an urging section, a movable member including a movable cam on its side is urged by a spring. A slide member includes, at one end, a stationary cam, opposed to the movable cam, for resiliently contacting the movable cam. The movable member is urged in opening and closing directions in open and closed states, respectively, according to which portion of the stationary cam resiliently contacts the movable cam. A reversing section includes a release member and a reversing member. The release member includes a release cam resiliently contacting a support cam at the other end of the slide member, and the reversing member is inserted into the slide member and includes a reversing cam. When the release cam is disconnected from the support cam, the slide member slides axially, whereby the movable cam is disconnected from the stationary cam and resiliently contacts the reversing cam. The direction that urges the movable member is thus reversed, changing from the closing to opening direction.

17 Claims, 11 Drawing Sheets

FIG. 9 – PRIOR ART
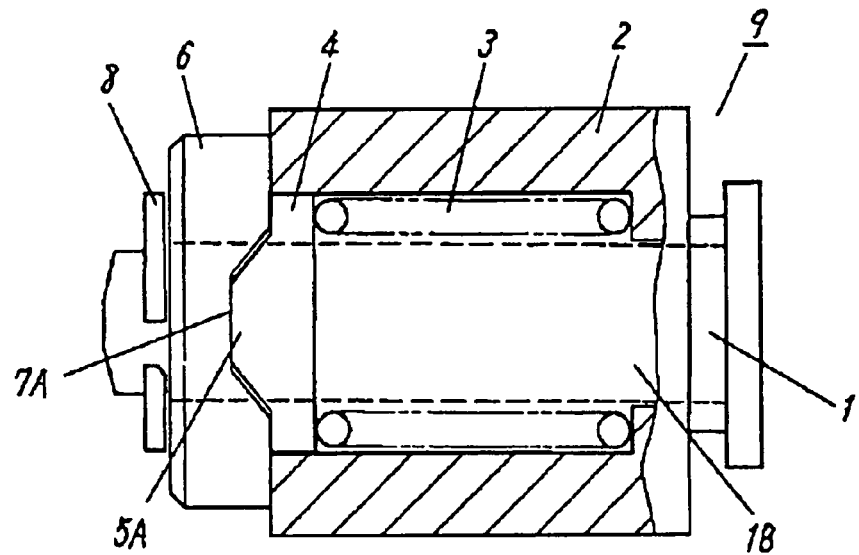
FIG. 10 – PRIOR ART
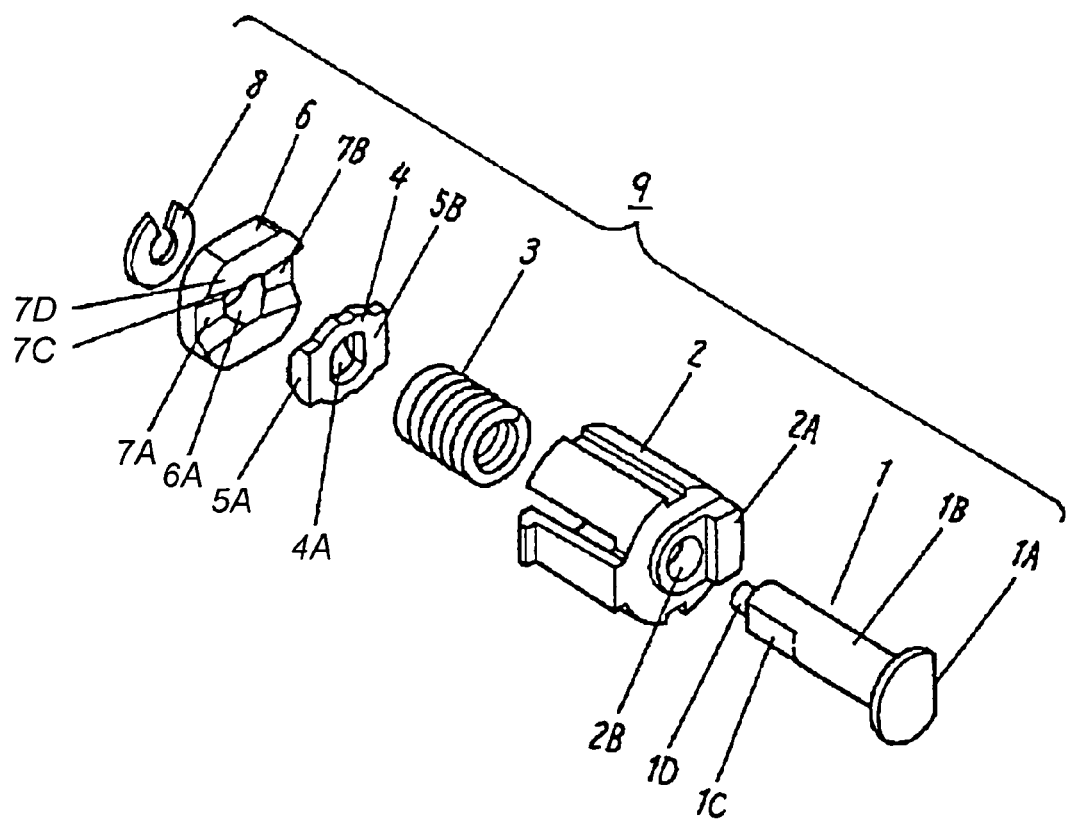

FIG. 11A – PRIOR ART
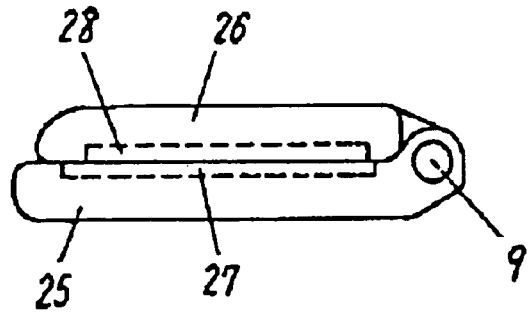
FIG. 11B - PRIOR ART
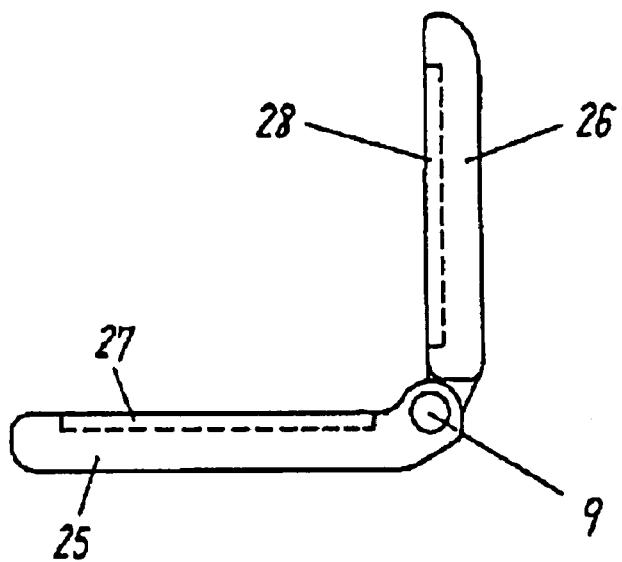
FIG. 11C – PRIOR ART
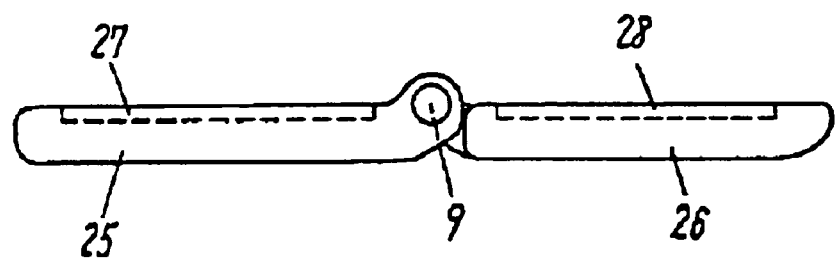

FIG. 12A – PRIOR ART
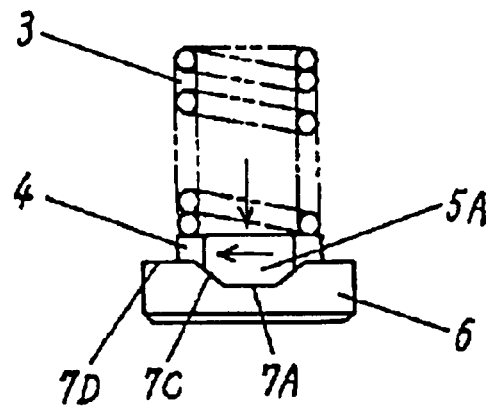
FIG. 12B – PRIOR ART
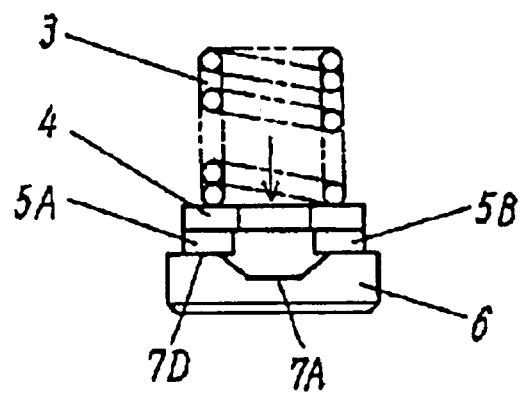
FIG. 12C – PRIOR ART
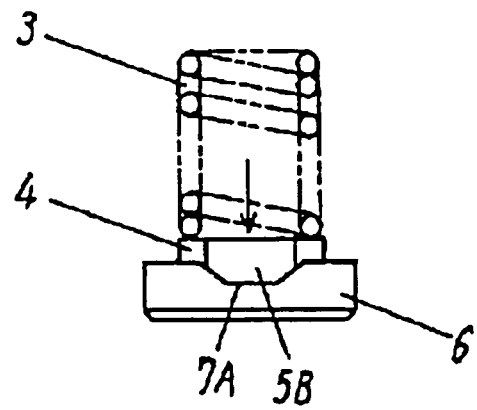

OPENING AND CLOSING DEVICE AND ELECTRONIC APPARATUS USING THE SAME

FIELD OF THE INVENTION

The present invention relates to an opening and closing device used in an electronic apparatus such as a portable telephone or a small personal computer and also relates to the electronic apparatus using this opening and closing device.

DESCRIPTION OF RELATED ART

Recently, an electronic apparatus such as a portable telephone or a small personal computer has become increasingly smaller, more lightweight and more functional. The number of so-called folding electronic apparatuses, each of which has a movable housing mounted to a stationary housing so as to be able to open and close, has grown, and in these electronic apparatuses, opening and closing devices are used to facilitate the opening and closing operation.

An example of the conventional opening and closing device and the electronic apparatus using this device will be described hereinafter with reference to FIGS. 9–12.

FIG. 9 is a sectional view of the conventional opening and closing device.

FIG. 10 is an exploded perspective view of the same opening and closing device.

In FIGS. 9 and 10, cylinder 1B of movable shaft 1 is passed through central through hole 2B of movable casing 2. End 1A of movable shaft 1 is locked to stepped part 2A at a right side of movable casing 2, whereby movable shaft 1 is fixed to movable casing 2. Movable shaft 1 is made of metal, and movable casing 2 is substantially cylindrical and made of resin.

Resilient spring 3 formed of metal wire is housed in movable casing 2 in a slightly contracted condition. Lock part 1C of movable shaft 1 is passed through substantially elliptical through hole 4A in the center of movable member 4 made of metal, so that movable member 4 is locked so as to be axially movable. Movable member 4 is urged rectilinearly by spring 3.

Stationary member 6 is made of metal and has central through hole 6A through which a tip of cylinder 1B of movable shaft 1 is rotatably passed. Movable cam 5A of movable member 4 that provides a click feel is in resilient contact with stationary cam 7A of stationary member 6. Movable cam 5B opposite to movable cam 5A is in resilient contact with stationary cam 7B.

Movable shaft 1 is thus passed through movable casing 2, movable member 4 and stationary member 6, and C-ring 8 is fixed to lock part 1D of movable shaft 1. Opening and closing device 9 is thus formed with movable shaft 1, movable casing 2 and movable member 4 rotatably provided to stationary member 6.

Referring to FIG. 11, which includes side views, a description will be provided next of the electronic apparatus using the opening and closing device 9 described above.

In FIG. 11, stationary housing 25 is formed with, at its top surface, operating part 27 formed of a plurality of keys. Movable housing 26 is formed with, at its inner surface, display part 28 such as an LCD. Stationary housing 25 and the movable housing are formed of insulating resin.

Stationary member 6 of opening and closing device 9 is mounted to an end of stationary housing 25, while movable casing 2 is mounted to an end of movable housing 26. Movable housing 26 is rotatably supported by opening and closing device 9 so as to be able to open and close relative to stationary housing 25.

Referring to FIG. 11 and FIG. 12, which includes sectional views each illustrating an essential part in an operating condition, a description will be provided hereinafter of the opening and closing operation of the above-structured opening and closing device and the electronic apparatus using this device.

FIG. 11A illustrates movable housing 26 in a closed state where the surface of movable housing 26 is in contact with the top surface of stationary housing 25. In this state, movable cam 5A of movable member 4 urged by spring 3 engages with stationary cam 7A of stationary member 6, as shown in FIG. 12A, so that opening and closing device 9 is held in the closed state.

When a user swings movable housing 26 in a direction that opens movable housing 26 from the closed state against the urging force of spring 3, movable casing 2 locked to movable housing 26 causes movable cam 5A of movable member 4 to move toward slope 7C against the urging force of spring 3 through rotation.

FIG. 11B illustrates movable housing 26 in a half-open state where movable housing 26 is swung to a substantially upright position. In this state, movable casing 2 causes movable member 4 to rotate with respect to stationary member 6 of opening and closing device 9, as shown in FIG. 12B. Accordingly, movable cam 5A moves to flat part 7D of a top surface of stationary member 6 through rotation.

FIG. 11C illustrates movable housing 26 in an open state where movable housing 26 is operated to open with respect to stationary housing 25. In this state, movable cam 5B positioned opposite to movable cam 5A engages with stationary cam 7A, as shown in FIG. 12C, thus maintaining the open state.

To close movable housing 26 from this open state, the user swings movable housing 26 in a direction opposite to the direction described above, that is, in the direction that closes movable housing 26. In this way, movable housing 26 is closed.

With the above-described conventional opening and closing device and the electronic apparatus using this device, the user can close movable housing 26 with one hand with relative ease.

To swing movable housing 26 to the open state from the closed state, the user performs the opening operation against the urging force of spring 3. For this reason, the user, for example, holds stationary housing 25 with one hand and swings movable housing 26 open with the other hand. The opening operation is thus troublesome.

BRIEF SUMMARY OF THE INVENTION

The present invention aims to provide an opening and closing device, which allows a user to easily perform opening and closing operation with one hand, and also aims to provide an electronic apparatus using this opening and closing device.

To achieve the above-mentioned object, the present invention has the following structure.

In the opening and closing device of this invention, a movable member is coupled to a stationary member to be rotatable in opening and closing directions.

An urging section urges the movable member in the opening direction in an open state and urges the movable member in the closing direction in a closed state.

A reversing section reverses, in the closed state, the direction the urging section urges the movable member so that the urging direction changes from the closing direction to the opening direction.

The opening and closing device of this invention further includes a movable casing, coupled to the movable member, for rotating in accordance with movement of the movable member.

In the opening and closing device of this invention, the movable casing, a spring, the movable member, a slide member, a reversing member, a release member and the stationary member are shaped into a cylinder and arranged along an axis of the cylinder.

The urging section includes the movable member and the slide member. The movable member is urged by the spring having one end pressed by the movable casing and includes a movable cam disposed along a side of the movable member. The slide member includes, at a side of one end of the slide member, a stationary cam, opposed to the movable cam, for resiliently contacting the movable cam. This slide member is disposed between the movable member and the stationary member.

The movable member is urged in the opening or closing direction according to which portion of the stationary cam is in resilient contact with the movable cam.

The reversing section includes the release member and the reversing member.

The release member includes a release cam resiliently contacting a support cam disposed on a side positioned at the other end of the slide member. This release member is disposed between the slide member and the stationary member. The reversing member is inserted into a hollow part of the slide member and includes a reversing cam.

Rotation of the release member disconnects the release cam from the support cam, whereby the slide member slides axially. Accordingly, the movable cam is disconnected from the stationary cam and comes into resilient contact with the reversing cam. Consequently, the movable member is urged in the opening direction.

In the opening and closing device of this invention, a release shaft is rotatably passed through the stationary member and connected to the release member. As the release shaft rotates, the release member is rotated accordingly, whereby the release cam is disconnected from the support cam. The opening and closing device thus rotates in the opening direction.

The electronic apparatus of this invention includes the above-mentioned opening and closing device, and its stationary housing includes at least one of an operating part and an audio input unit at its top surface. A movable housing of this electronic apparatus includes at least one of a display part and an audio output unit at its surface. The stationary member of the opening and closing device is coupled to the stationary housing, while the movable member is coupled to the movable housing.

The opening and closing device, which allows the user to open and close easily with one hand, and the electronic apparatus using this device can thus be obtained.

BRIEF DESCRIPTION OF THE DRAWINGS

FIG. 9 is a sectional view of a conventional opening and closing device.

FIG. 10 is an exploded perspective view of the conventional opening and closing device.

FIGS. 11A, 11B and 11C are side views of an electronic apparatus using the conventional opening and closing device.

FIGS. 12A, 12B and 12C are sectional views each illustrating an essential part of the conventional opening and closing device in an operating condition.

DETAILED DESCRIPTION OF THE PREFERRED EMBODIMENT

An exemplary embodiment of the present invention will be demonstrated hereinafter with reference to FIGS. 1–8.

EXEMPLARY EMBODIMENT

Figure 1:
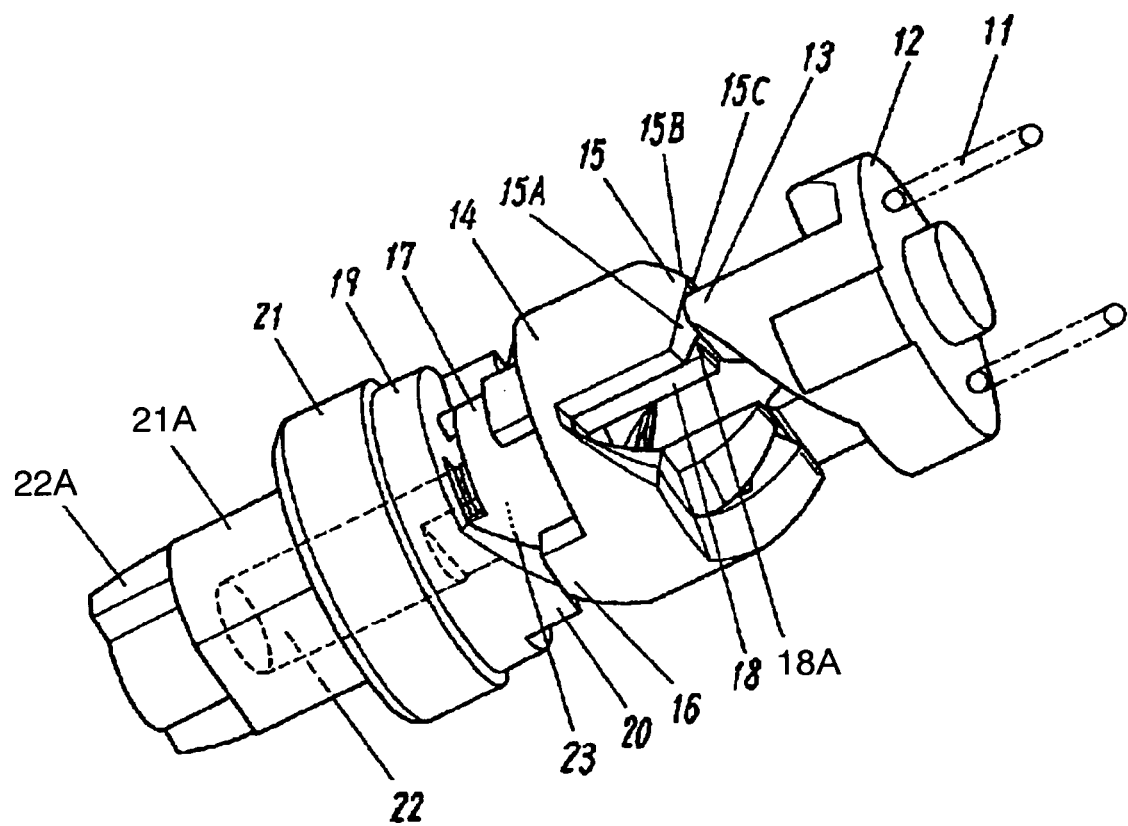
FIG. 1 is a perspective view of an essential part of an opening and closing device in accordance with an exemplary embodiment of the present invention.

FIG. 1 is a perspective view of an essential part of opening and closing device 30 in accordance with the exemplary embodiment of the present invention.

Figure 2:
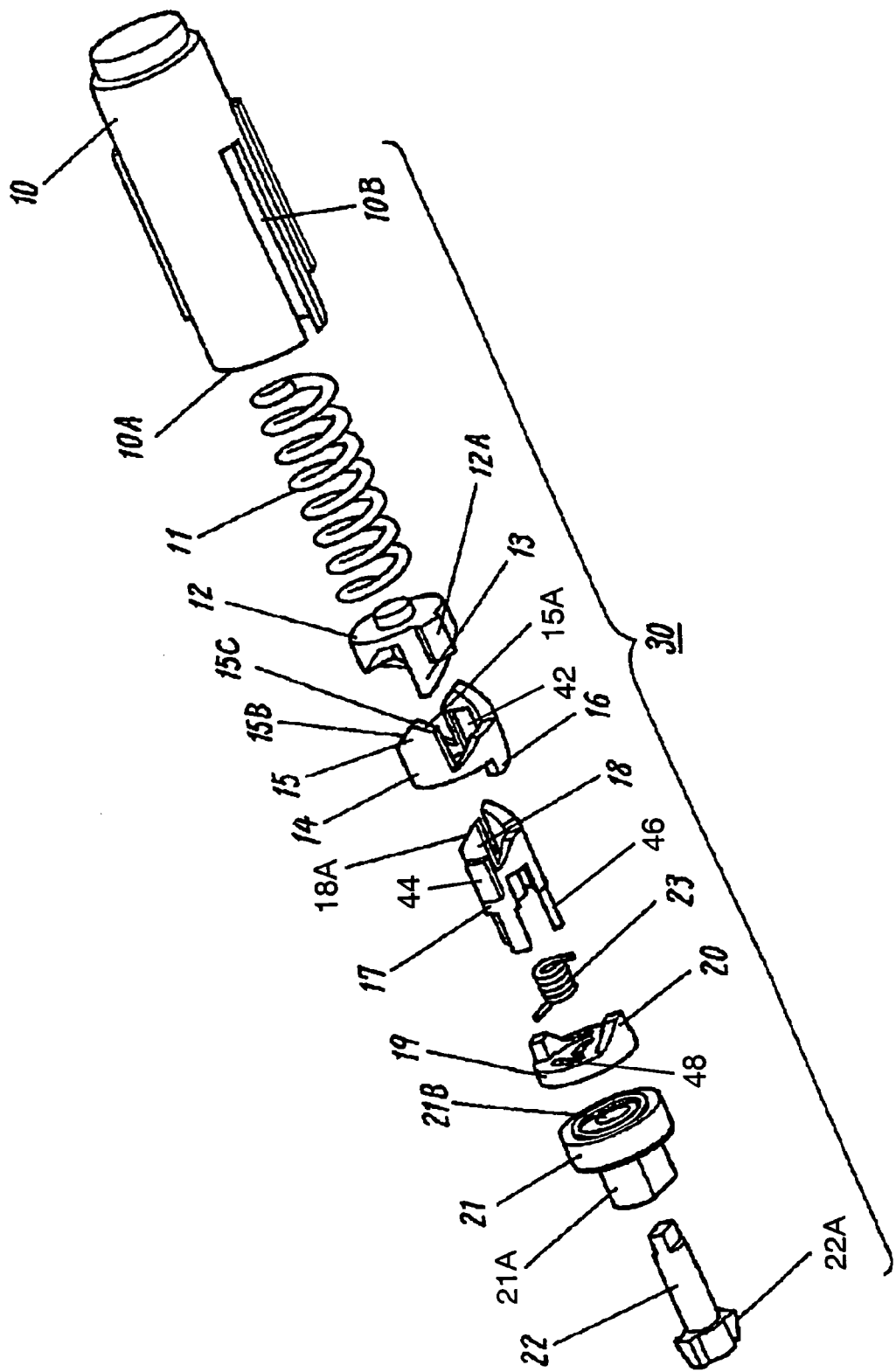
FIG. 2 is an exploded perspective view of the opening and closing device in accordance with the embodiment.

FIG. 2 is an exploded perspective view of the opening and closing device.

In FIGS. 1 and 2, opening and closing device 30 includes movable casing 10 and stationary member 21 and also includes spring 11, movable member 12, slide member 14, reversing member 17, release member 19, release shaft 22 and return spring 23 between movable casing 10 and stationary member 21.

For explanation, "left" or "right" is hereinafter used to indicate the direction in the drawings.

Movable casing 10 is made of resin and is substantially cylindrical. The movable casing 10 has an opening 10A at its left side and includes, in its outer periphery, recessed part 10B, which is shaped like an oblong hole and extends axially from opening 10A. Resilient coiled spring 11 formed of metal wire is housed in movable casing 10 in a slightly contracted condition.

Movable member 12 is urged by spring 11 and is located to the left of spring 11 so as to be axially movable with projection 12A. Projection 12A is provided on a periphery of movable member 12, and is engaged in recessed part 10B of movable casing 10. The movable member 12 is made of metal and is substantially cylindrical. Movable cam 13 projects substantially in the form of a triangle and is provided on a left side of movable member 12.

Slide member 14 is made of metal and is a substantially cylindrical slide member having a hollow part along its axis. Slide member 14 is provided with, along a border of its right side, stationary cam 15 which includes two slopes 15A, 15B adjacent to each other across tip 15C. Movable cam 13 of movable member 12, which is urged by spring 11, resiliently contacts lower slope 15A of stationary cam 15.

As described above, an urging section is formed to include above-described spring 11, movable member 12 and slide member 14.

Reversing member 17 is made of metal, substantially cylindrical and disposed inside the hollow part of slide member 14. Along a border of a right side of reversing member 17, reversing cam 18 formed with upwardly sloping slope 18A is provided in a position opposed to movable cam 13.

Reversing member 17 also includes projection 44 on its outer periphery. This projection 44 engages recessed part 42 within the hollow part of slide member 14. Projection 44 and recessed part 42 are formed so as to allow slide member 14 to slide axially.

Release shaft 22 is substantially cylindrical, made of metal and provided with knob 22A at its left end.

Release member 19 is made of metal and includes substantially trapezoidal release cam 20 on its right side.

Substantially cylindrical stationary member 21 is made of metal and provided with, on its left side, engagement part 21A attached to a stationary housing of an electronic apparatus. Leg 46 projecting from a left side of reversing member 17 is fixed into a right side of stationary member 21.

Leg 46 of reversing member 17 is passed through hole 48 of release member 19.

Release shaft 22 is rotatably passed through central through hole 21B of stationary member 21. Release member 19 is locked to a right end of release shaft 22. The release member 19 is disposed between stationary member 21 and a combination of slide member 14 and reversing member 17 so as to be rotatable to a given angle.

Accordingly, there is a clearance between hole 48 of above-mentioned release member 19 and leg 46 of reversing member 17 for allowing release member 19 to rotate to the given angle.

Return spring 23 is a resilient torsion coil spring made of metal wire and is disposed between release member 19 and reversing member 17. Ends of return spring 23 are locked to release member 19 and reversing member 17, respectively. Return spring 23 urges release member 19 in the direction of rotation.

Substantially trapezoidal support cam 16 is provided along a border of a left side of slide member 14. The urging force of spring 11 is transmitted to the support cam 16 via movable cam 13 of movable member 12 and stationary cam 15 on the right side of slide member 14. The urging force of spring 11 causes support cam 16 to resiliently contact release cam 20 of release member 19.

When release member 19 is rotated against the urging force of return spring 23, release cam 20 rotates accordingly, thereby being disconnected from support cam 16. Here, slide member 14 slides axially leftward, and movable cam 13 comes into resilient contact with slope 18A of reversing cam 18, moving from slope 15A of stationary cam 15.

A reversing section is formed to include the above-described reversing member 17, slide member 14, release member 19 and release shaft 22.

Between movable casing 10 and stationary member 21, spring 11, movable member 12, slide member 14, reversing member 17, release member 19, release shaft 22 and return spring 23 are arranged substantially on the same axis.

In this way, opening and closing device 30 is configured.

Figure 3:
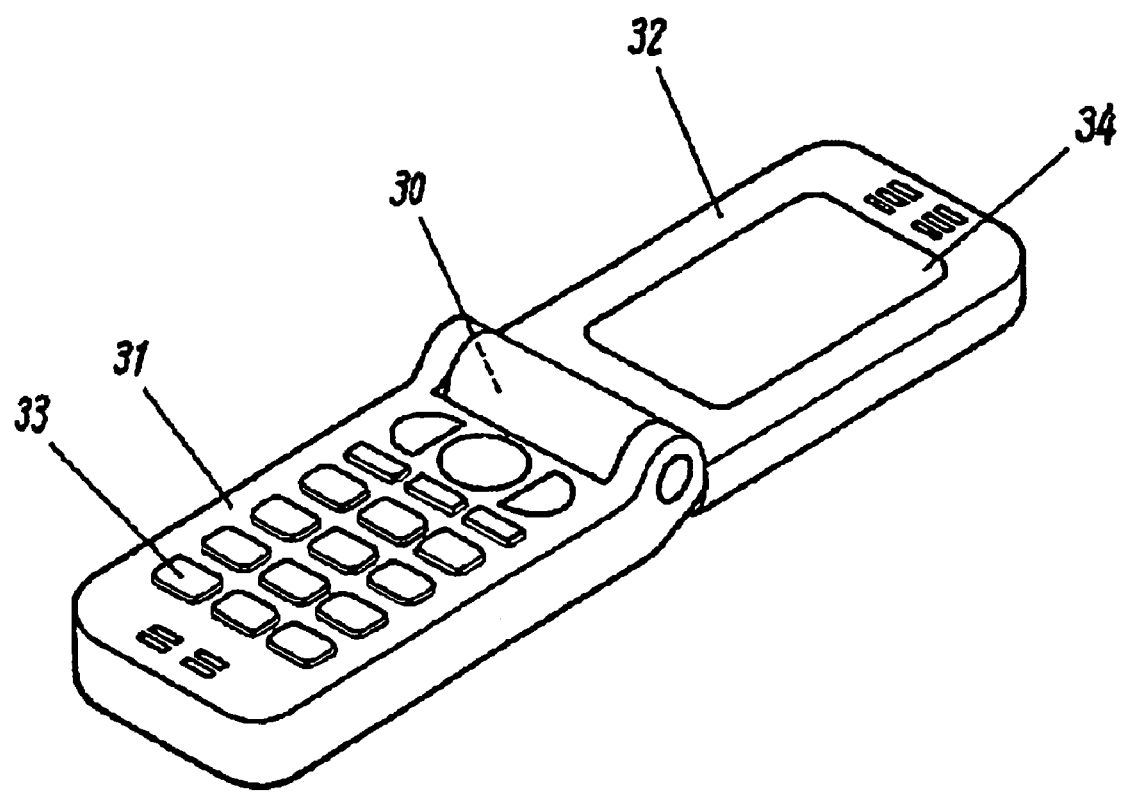
FIG. 3 is a perspective view of an electronic apparatus in accordance with the embodiment.

Referring to FIG. 3, which is a perspective view of the electronic apparatus, a description will be provided next of the electronic apparatus using opening and closing device 30 having the above structure.

In FIG. 3, the electronic apparatus includes stationary housing 31 and movable housing 32 each made of insulating resin.

Stationary housing 31 is formed with, at its top surface, operating part 33 formed of a plurality of keys, and an audio input unit such as a microphone. Movable housing 32 is formed with, at its surface, display part 34 such as an LCD, and an audio output unit such as a loudspeaker.

Stationary member 21 of opening and closing device 30 is mounted to an end of stationary housing 31, while movable casing 10 is mounted to an end of movable housing 32. Movable housing 32 is rotatably supported by opening and closing device 30 so as to be able to open and close relative to stationary housing 31.

Referring to FIGS. 4–6, a description will be provided hereinafter of the opening and closing operation of the opening and closing device 30 having the above structure and the electronic apparatus using this device.

As mentioned earlier, movable cam 13, stationary cam 15, support cam 16, reversing cam 18 and release cam 20 are provided at a periphery of the substantially cylindrical construction in three dimensions in reality. However, these elements are shown in developed plan views in FIGS. 5 and 6 for easy understanding of the operation of each element.

Figure 4A:
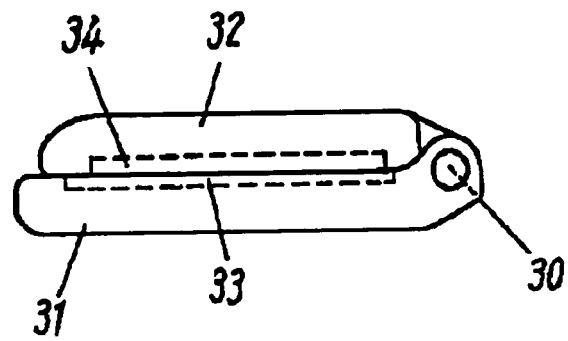
FIGS. 4A, 4B and 4C are side views each illustrating the electronic apparatus in an operating condition in accordance with the embodiment.
Figure 4B:
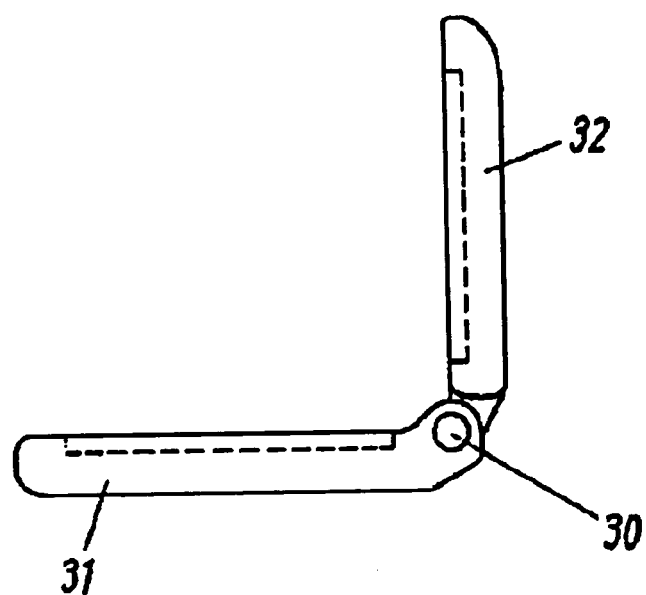

FIG. 4A illustrates movable housing 32 in a closed state where the surface of movable housing 32 is in contact with the top surface of stationary housing 31.

Figure 5A:
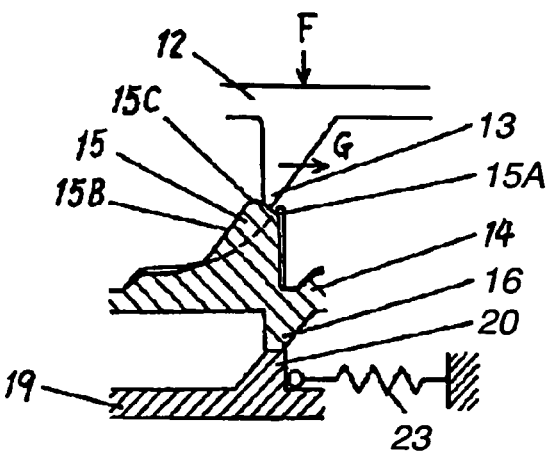
FIGS. 5A, 5B, 5C and 5D are sectional developed views of an essential part for illustrating operation of the opening and closing device in accordance with the embodiment.

When opening and closing device 30 is in this closed state, movable cam 13 of movable member 12, which is urged downward by spring 11 as indicated by arrow F, is in resilient contact with slope 15A of stationary cam 15, as shown in FIG. 5A. Movable member 12 is thus held by being urged rightward, that is, in a closing direction indicated by arrow G.

Figure 5B:
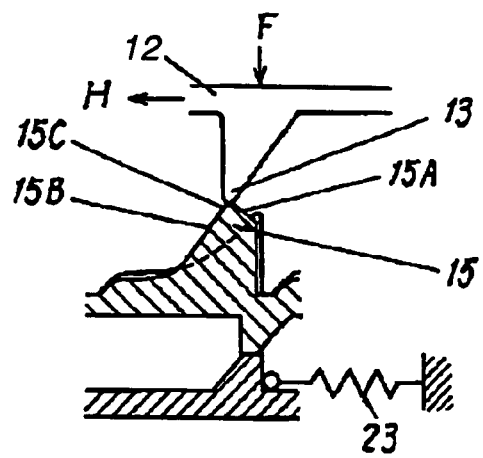

When a user swings movable housing 32 open, movable housing 32 and movable casing 10 rotate, whereby movable member 12 and movable cam 13 move leftward as indicated by arrow H in FIG. 5B against the rightward urging force of spring 11. Movable cam 13 thus crosses over tip 15C from slope 15A of stationary cam 15 and comes into resilient contact with slope 15B. Consequently, movable member 12 is urged leftward, that is, in an opening direction.

Figure 4C:
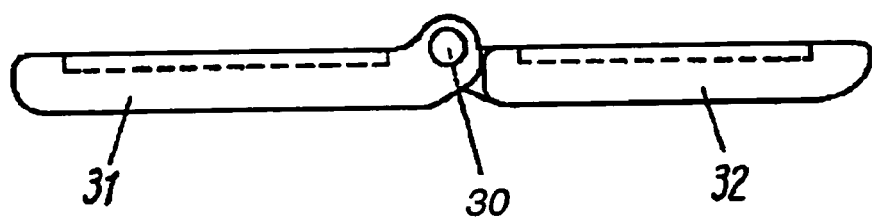
Figure 5C:
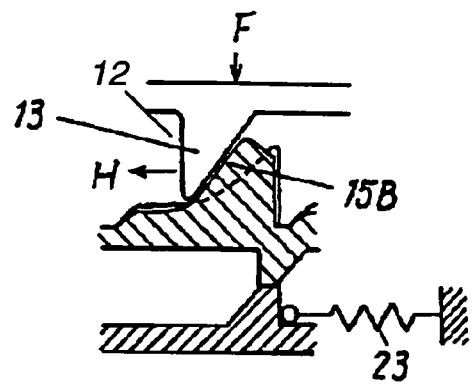

Then, movable cam 13 resiliently slides over slope 15B of stationary cam 15, as shown in FIG. 5C. Here, movable housing 32 shifts from a halfway state illustrated by FIG. 4B where movable housing 32 is swung to a substantially upright position relative to stationary housing 31 to a state illustrated by FIG. 4C where movable housing 32 is opened fully with respect to stationary housing 31.

Figure 5D:
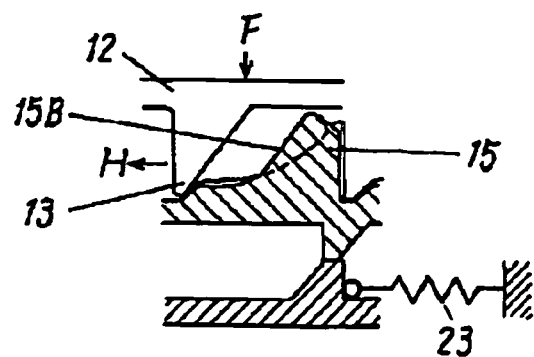

In the state where movable housing 32 is opened fully, movable cam 13 resiliently contacts a left end of slope 15B of stationary cam 15, as shown in FIG. 5D. Movable housing 32 mounted with movable member 12 is thus held in a state where movable housing 32 is urged leftward, that is, in the opening direction.

When the user closes movable housing 32 from this open state, movable cam 13 resiliently slides over stationary cam 15 in reverse order, that is, in order of FIGS. 5C, 5B and 5A. In this way, movable housing 32 is closed.

A description will be provided next of a case where the user uses the reversing section instead of the hand such as described above to open movable housing 32 from the closed state.

Figure 6A:
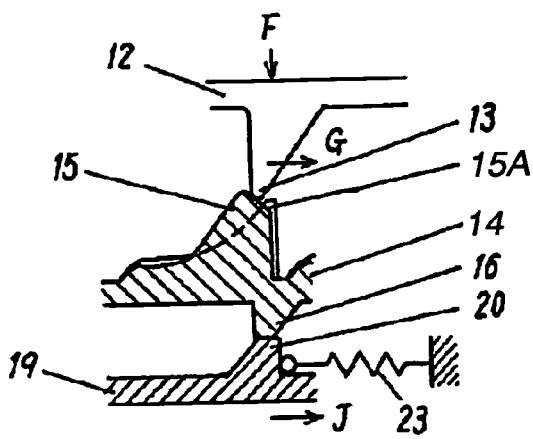
FIGS. 6A, 6B, 6C and 6D are sectional developed views of the essential part of the opening and closing device for illustrating operation in accordance with the embodiment.

In the state illustrated by FIG. 4A where movable housing 32 is closed, movable cam 13 of movable member 12 urged by spring 11 is in resilient contact with slope 15A of stationary cam 15, as shown in FIG. 6A.

Figure 6B:
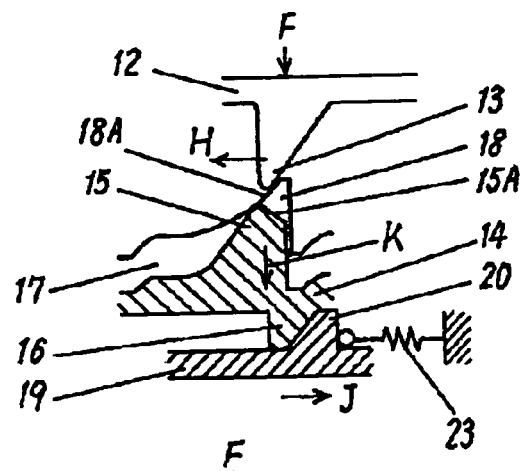

When knob 22A of release shaft 22 is turned against the urging force of return spring 23, release member 19 locked to the right end of release shaft 22 moves rightward as indicated by arrow J in FIG. 6B. Here, release cam 20 is disconnected from support cam 16, whereby slide member 14, urged by movable cam 13, moves axially downward as indicated by arrow K.

Then, movable cam 13 moves from slope 15A of stationary cam 15 and comes into resilient contact with slope 18A of reversing cam 18. Movable cam 13 thus resiliently slides over slope 18A. Here, movable member 12 is urged leftward, that is, in the opening direction indicated by arrow H. Then movable member 12 moves in the opening direction through rotation from the state where movable member 12 is urged rightward or in the closing direction. In this way, movable housing 32 swings open.

Figure 6C:
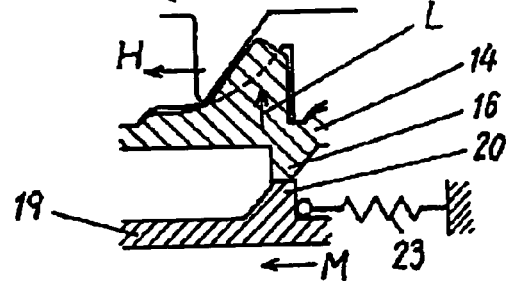

When knob 22A of release shaft 22 is released from the turning operation, release member 19 and release cam 20 move leftward as indicated by arrow M in FIG. 6C by being urged by return spring 23. Consequently, slide member 14 is pushed up as indicated by arrow L via support cam 16, thereby returning to its original state.

FIG. 4C illustrates movable housing 32 fully opened with respect to stationary housing 31.

Figure 6D:
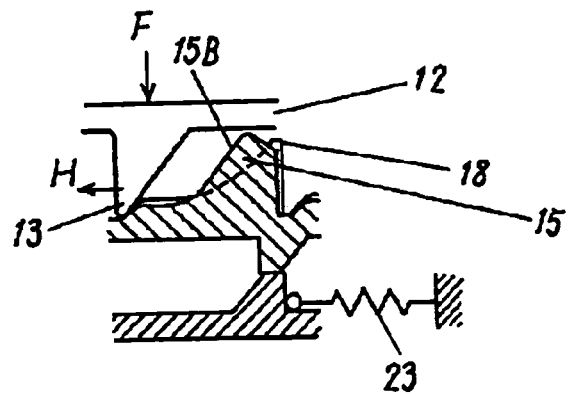

In this state, movable cam 13 resiliently contacts the left end of slope 15B of stationary cam 15, as shown in FIG. 6D. Movable housing 32 mounted with movable member 12 is thus held in the state where movable housing 32 is urged leftward, that is, in the opening direction.

According to the present embodiment described above, opening and closing device 30 includes the reversing section, formed of release cam 20, reversing cam 18 and others, for reversing the direction the urging section urges so that the urging direction changes from the closing direction to the opening direction.

This structure allows not only opening and closing of movable housing 32 by the user's hand but also opening of movable housing 32 through easy operation of the reversing section. Thus, the opening and closing device, which facilitates opening and closing with one hand, and the electronic apparatus using this device can be obtained.

The elements that form the urging section and the reversing section, including spring 11, movable member 12, slide member 14, reversing member 17, release member 19 and stationary member 21 are arranged on the same axis. Thus, the opening and closing device is formed so as to be small.

An open position and a closed position of movable housing 32 can be detected in the following manner.

For example, a variable resistor including a contact piece and a carbon electrode is formed as a detecting element between stationary member 21 and movable member 12 or movable casing 10, and the electronic apparatus is provided with a detection circuit connected to this detecting element.

The detecting element thus detects the open and closed positions of movable member 12 or movable housing 32. This enables the apparatus to perform various functions. For example, the display on display part 34 can be turned off in the closed state and turned on in the open state.

The detecting element can be a switch, an optical sensor, a magnetic sensor or the like instead of the variable resistor.

In the above description, knob 22A of release shaft 22 is turned to operate the reversing section. However, other various operations of knob 22A, including pushing, can effect the operation of the reversing section.

In the above description, axially extending recessed part 10B having the shape of an oblong hole is provided in the outer periphery of movable casing 10. This recessed part 10B engages with projection 12A of movable member 12, so that movable casing 10 and movable member 12 rotate to the same angle.

In another structure, a movable casing can be rotated to an angle larger or smaller than that of a movable member by sloping a recessed part.

Figure 7:
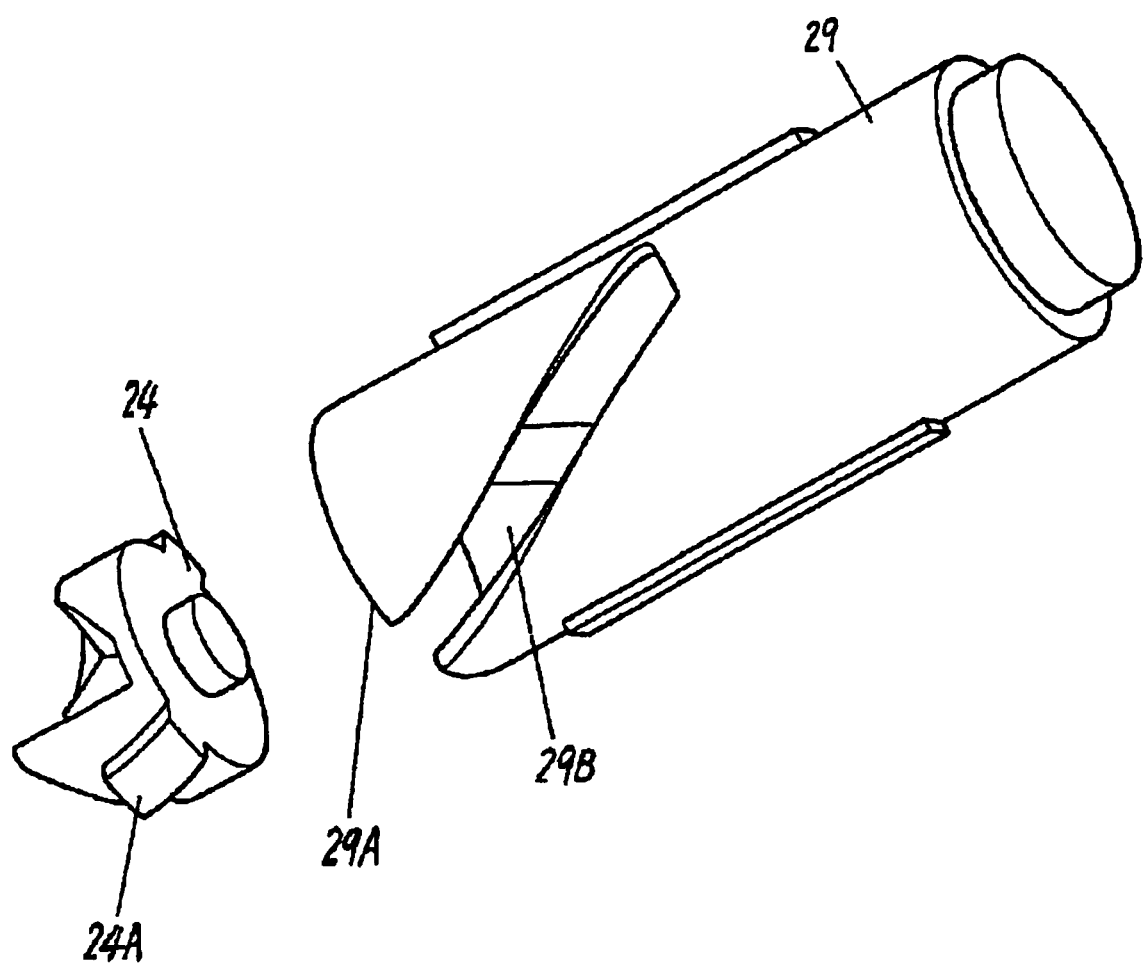
FIG. 7 is an exploded perspective view of an essential part in accordance with another exemplary embodiment.

In other words, as shown in FIG. 7, which is an exploded perspective view of an essential part, movable casing 29 is formed with recessed part 29B, which is shaped like an oblong hole and sloped relative to the axial direction from opening 29A. Projection 24A of movable member 24 engages this recessed part 29B.

In this structure, movable member 24 rotates while moving axially with respect to a stationary member (not shown). Here, movable casing 29 rotates to the angle larger or smaller than the rotation angle of movable member 24 in accordance with the sloping direction.

For example, in cases where, as shown in FIG. 7, recessed part 29B is sloped in an upper-right direction from opening 29A, when movable member 24 moves leftward within movable casing 29 while rotating upward, movable casing 29, having recessed part 29B urged by projection 24A of movable member 24, rotates upward to the angle larger than the rotation angle of movable member 24.

When movable member 24 moves rightward while rotating downward, the angle of downward rotation of movable casing 29 is smaller than the rotation angle of movable member 24. A difference between these rotation angles varies, depending on an angle of inclination of recessed part 29B.

In cases where recessed part 29B is sloped in lower-right direction from opening 29A, the relationship between the angle of upward rotation and the angle of downward rotation is the reverse one of the relationship described above.

As described above, sloping recessed part 29B of movable casing 29 with respect to the axial direction causes movable casing 29 to rotate to the angle larger or smaller than that of movable member 24 in accordance with the sloping direction when the movable member rotates while moving axially with respect to the stationary member. For this reason, a movable housing of an electronic apparatus that is mounted with this movable casing 29 can be opened and closed to a large or small angle in an arbitrary direction.

Instead of being formed into the oblong hole in the outer periphery of movable casing 10 or 29, the recessed part may be provided in the form of a groove in an inner periphery of the movable casing.

In the above description, the elements such as spring 11, movable member 12, slide member 14, reversing member 17, release member 19 and stationary member 21 are arranged on the same axis to form the urging section and the reversing section.

Alternatively, the opening and closing device may have the following structure.

As shown in FIG. 8, one end of resilient coiled spring 37 formed of metal wire is held by stationary member 35 with spring 37 in a little contracted condition. The other end of spring 37 is held by movable member 36 rotatably locked to stationary member 35.

Figure 8A:
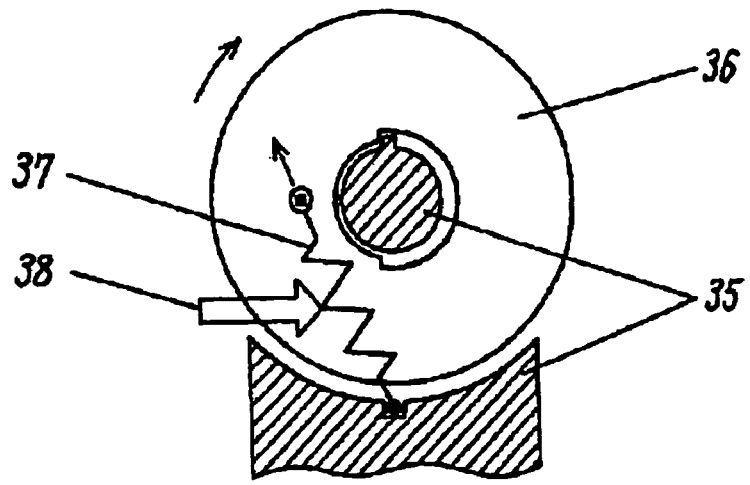
FIGS. 8A, 8B and 8C are sectional views of an essential part in accordance with still another exemplary embodiment.
Figure 8B:
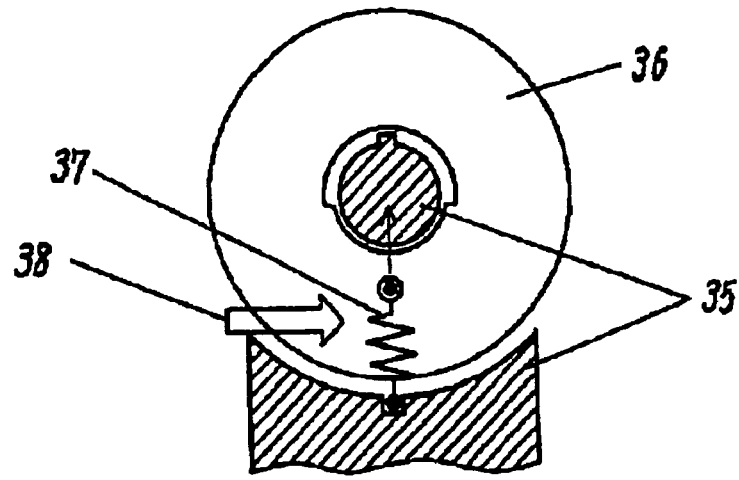

FIG. 8A illustrates movable member 36 in a closed state with respect to stationary member 35. In this state, reversing section 38 urges spring 37 to a halfway state illustrated by FIG. 8B, whereby the urging force of spring 37 that acts on movable member 36 is reversed so that the urging direction changes from the closing direction to the opening direction.

Figure 8C:
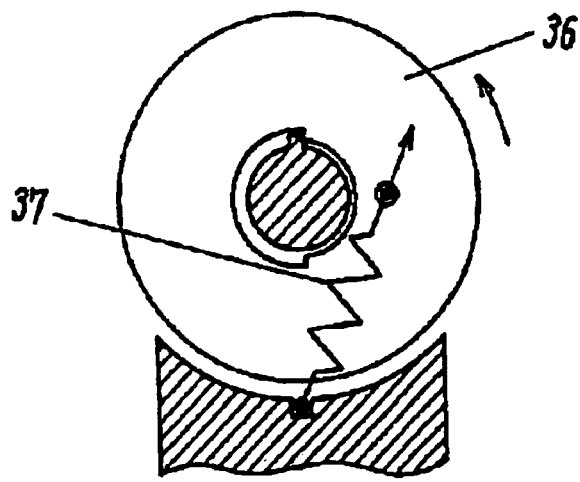

Movable member 36 is thus held in an open state, as shown in FIG. 8C by being urged in the opening direction by spring 37.

Opening and closing device 30 described above can be mounted to the electronic apparatus such as shown in FIG. 3. The electronic apparatus mentioned here includes stationary housing 31 and movable housing 32.

Stationary housing 31 is formed with at least one of the operating part and the audio input unit at its top surface. Movable housing 32 is formed with at least one of the display part and the audio output unit at its surface. The end of movable housing 32 is mounted with the movable casing of the opening and closing device. Thus, the user can easily open and close this electronic apparatus with one hand.

INDUSTRIAL APPLICABILITY

According to the present invention described above, the opening and closing device, which allows the user to easily perform opening and closing operation with one hand, and the electronic apparatus using this opening and closing device can be obtained.

The invention claimed is:

1. An opening and closing device comprising:
a stationary member;
a movable member coupled to said stationary member so as to be rotatable in opening and closing directions;
an urging section for urging said movable member in the opening direction in an open state and urging said movable member in the closing direction in a closed state;
a reversing section for reversing, in the closed state, a direction that said urging section urges said movable member so that the urging direction changes from the closing direction to the opening direction; and
a movable casing connected to said movable member, said movable casing being operable to rotate in accordance with movement of said movable member, wherein:
said urging section comprises:
  said movable member urged by a spring having an end pressed by said movable casing, said movable member including a movable cam disposed along a side of said movable member; and
  a stationary cam at a first end of a slide member, said stationary cam being opposed to said movable cam, for resiliently contacting said movable cam, said slide member being disposed between said movable member and said stationary member;
said movable member is being arranged so as to be urged in one of the opening and closing directions according to which portion of said stationary cam is in resilient contact with said movable cam;
said reversing section comprises:
  a release member including a release cam resiliently contacting a support cam disposed on a second end of said slide member, said release member being disposed between said slide member and said stationary member; and
  a reversing member inserted into a hollow part of said slide member, said reversing member including a reversing cam; and
wherein said movable casing, said spring, said movable member, said slide member, said reversing member, said release member and said stationary member are shaped into a cylinder and arranged along an axis of said cylinder, and due to rotation of said release member, said release cam is disconnected from said support cam, said slide member slides axially, said movable cam is disconnected from said stationary cam and comes into resilient contact with said reversing cam, and consequently, said movable member is urged in the opening direction.

2. The opening and closing device of claim 1, further comprising:
a release shaft rotatably passed through said stationary member and connected to said release member such that a rotation of said release shaft rotates said release member for disconnecting said release cam from said support cam.

3. The opening and closing device of claim 1, wherein:
(i) said stationary cam includes first and second slopes, said movable member is being arranged so as to be urged in the opening direction when said movable cam resiliently contacts said first slope, and said movable member is being arranged so as to be urged in the closing direction when said movable cam resiliently contacts said second slope; and
(ii) said reversing cam includes a third slope, and said movable member being arranged so as to be urged in the opening direction when said movable cam resiliently contacts said third slope of said reversing cam.

4. An electronic apparatus comprising:
the opening and closing device of claim 1;
a stationary housing including at least one of an operating part and an audio input unit at a top surface of said stationary housing; and
a movable housing including at least one of a display part and an audio output unit at a surface of said movable housing,
wherein said stationary member is connected to said stationary housing, and said movable member is connected to said movable housing.

5. The opening and closing device of claim 2, wherein:
(i) said stationary cam includes first and second slopes, said movable member being arranged so as to be urged in the opening direction when said movable cam resiliently contacts said first slope, and said movable member is being arranged so as to be urged in the closing direction when said movable cam resiliently contacts said second slope; and
(ii) said reversing cam includes a third slope, and said movable member being arranged so as to be urged in the opening direction when said movable cam resiliently contacts said third slope of said reversing cam.

6. The opening and closing device of claim 1, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction, and said recessed part is sloped relative to the axial direction.

7. The opening and closing device of claim 2, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction, and said recessed part is sloped relative to the axial direction.

8. The opening and closing device of claim 3, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction, and said recessed part is sloped relative to the axial direction.

9. The opening and closing device of claim 5, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction, and said recessed part is sloped relative to the axial direction.

10. The opening and closing device of claim 1, further comprising:
a release shaft connected to said release member such that a rotation of said release shaft rotates said release member to thereby disconnect said release cam from said support cam.

11. The opening and closing device of claim 1, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction of said movable casing, and a longitudinal axis of said recessed portion is sloped relative to the axial direction of said movable casing.

12. An opening and closing device comprising:
a movable casing having a substantially cylindrical shape;
a stationary member arranged along an axis of said movable casing;
a spring having one end pressed by said movable casing;
a movable member arranged to have a first end in contact with said spring in a direction of the axis of said movable casing such that said movable member is urged by said spring along the axis of said movable casing, said movable member having a movable cam at a second end in the direction of the axis of said movable casing, said movable member being rotatable around the axis of said movable casing in an opening direction and a closing direction;
a slide member operable to slide along the axis of said movable casing, said slide member having a hollow portion, a stationary cam in resilient contact with said movable cam at a first end of said slide member with respect to the direction of the axis of said movable casing, and a support cam at a second end of said slide member with respect to the direction of the axis of said movable casing;
a reversing member in the hollow portion of said slide member, said reversing member having a reversing cam operable to resiliently contact said movable cam; and
a release member in resilient contact with a stationary member at a first end with respect to the direction of the axis of said movable casing, said release member including a release cam at a second end with respect to the direction of the axis of said movable casing, said release cam being operable to resiliently contact said support cam, wherein said movable member, said slide member, said reversing member and said release member are arranged along the axis of said movable casing, and said movable member, said slide member, said reversing member, and said release member are arranged and interconnected such that, when said release member is rotated:
said release cam is disconnected from said support cam;
said slide member slides along the axis of said movable casing;
said movable cam is disconnected from said stationary cam and comes into resilient contact with said reversing cam; and
said movable member is thereby urged in the opening direction.

13. The opening and closing device of claim 12, further comprising:
a release shaft connected to said release member such that a rotation of said release shaft roatates said release member to thereby disconnect said release cam from said support cam.

14. The opening and closing device of claim 12, wherein:
(i) said stationary cam includes first and second slopes, said movable member being arranged so as to be urged in the opening direction when said movable cam resiliently contacts said first slope, and said movable member being arranged so as to be urged in the closing direction when said movable cam resiliently contacts said second slope; and
(ii) said reversing cam includes a third slope, and said movable member being arranged so as to be urged in the opening direction when said movable cam resiliently contacts said third slope of said reversing cam.

15. The opening and closing device of claim 12, further comprising:
a projection provided on a periphery of said movable member, wherein said movable casing includes a recessed part for engaging said projection, said movable member and said movable casing are shaped into a cylinder, said movable member is housed in said movable casing so as to be movable in an axial direction, and said recessed part is sloped relative to the axial direction.

16. An electronic apparatus comprising:
the opening and closing device of claim 12;
a stationary housing including at least one of an operating part and an audio input unit at a top surface of said stationary housing; and
a movable housing including at least one of a display part and an audio output unit at a surface of said movable housing, wherein said stationary member is connected to said stationary housing, and said movable member is connected to said movable housing.

17. The opening and closing device of claim 12, further comprising:

a projection provided on a periphery of said movable member, wherein said movable casing includes a recessed part for engaging said projection, said movable member and said movable casing are shaped into a cylinder, said movable member is housed in said movable casing so as to be movable in an axial direction of said movable casing, and a longitudinal axis of said recessed portion is sloped relative to the axial direction of said movable casing.

* * * * *

UNITED STATES PATENT AND TRADEMARK OFFICE
CERTIFICATE OF CORRECTION

| | | |
|---|---|---|
| PATENT NO. | : 7,151,226 B2 | Page 1 of 1 |
| APPLICATION NO. | : 10/470338 | |
| DATED | : December 19, 2006 | |
| INVENTOR(S) | : Katsuichi Minami et al. | |

It is certified that error appears in the above-identified patent and that said Letters Patent is hereby corrected as shown below:

Claim 1
In claim 1, line 27, please change "member is being arranged" to --member being arranged--.

Claim 3
In claim 3, line 3, please change "member is being arranged" to --member being arranged--.
In claim 3, line 6, please change "member is being arranged" to --member being arranged--.

Claim 5
In claim 5, lines 5-6, please change "member is being arranged" to --member being arranged--.

Signed and Sealed this

Seventeenth Day of April, 2007

JON W. DUDAS
*Director of the United States Patent and Trademark Office*